United States Patent [19]

von Asselt et al.

[11] Patent Number: 4,919,798

[45] Date of Patent: Apr. 24, 1990

[54] METHOD AND AN APPARATUS FOR SORTING AND EJECTING ARTICLES

[75] Inventors: Peter A. von Asselt; Jan Hord k, both of Aalten, Netherlands

[73] Assignee: Staalkat B.V., Netherlands

[21] Appl. No.: 308,279

[22] Filed: Feb. 9, 1989

[30] Foreign Application Priority Data

Feb. 15, 1988 [NL] Netherlands ........................ 8800365

[51] Int. Cl.[5] ......................... A01K 43/00; B07C 5/36

[52] U.S. Cl. .................................... 209/510; 209/564; 209/705; 209/942

[58] Field of Search ........................ 209/510, 563–565, 209/702, 703, 705, 938, 942; 364/460, 478

[56] References Cited

U.S. PATENT DOCUMENTS

| | | | |
|---|---|---|---|
| 3,659,085 | 4/1972 | Potter et al. | 364/460 X |
| 4,164,291 | 8/1979 | Carlow | 209/942 X |
| 4,410,091 | 10/1983 | Cowlin et al. | 209/705 X |
| 4,561,545 | 12/1985 | Carlow | 209/705 X |
| 4,805,778 | 2/1989 | Nambu | 209/705 X |

FOREIGN PATENT DOCUMENTS

| | | |
|---|---|---|
| 3036927 | 5/1982 | Fed. Rep. of Germany . |
| 3036949 | 5/1982 | Fed. Rep. of Germany . |

*Primary Examiner*—Johnny D. Cherry
*Assistant Examiner*—Edward M. Wacyra
*Attorney, Agent, or Firm*—Griffin, Branigan & Butler

[57] ABSTRACT

A method and apparatus for sorting articles passing an inspection station and subsequently removing selected articles from a transporting track. The position of the articles to be removed is determined by means of a pointer positioned next to an article during its movement along the inspection station, and the position moves along with the transporting track. A signal is generated by the pointer for removing the article from the track. The position of the article is determined by the pointer and at least two fixed points on either side of the inspection station. The pointer and the fixed points are fitted with an ultrasonic transmitter and a receiver, respectively, or the other way round, or with a combined transmitter/receiver.

13 Claims, 3 Drawing Sheets

METHOD AND AN APPARATUS FOR SORTING AND EJECTING ARTICLES

This invention relates to a method of sorting articles, such as eggs, fruit, potatoes, bottles, etc. passing an inspection station and subsequently removing selected articles from the transporting track, with the position of the articles to be removed being designated or singled out by means of a pointer during the movement of the article along the inspection station, said position moving along with the transporting track, while at the ejector station a signal is generated in order to remove the article from its transporting track.

Similar methods are known: see e.g. Dutch patent application 7707946.

Also known are systems with video cameras provided above the articles to be sorted, in which an article is pointed out by means of a spot of light, after which the video camera fixes the position of the spot of light (USP 4,410,091).

Furthermore, a functionally simple sytem is known wherein beside the article there are provided push bottons or pawls moving along with the article. The pawls are operated in the selection station and the position of the pawls is read out at the sorting portion, after which all pawls are brought into the starting position: Dutch patent application 8303804 (MOBA).

These systems have the drawback that they are difficult to operate or difficult to use during the sorting of eggs due to the glaring illumination from the underside, or to their being sensitive to electromagnetic interference. It is an object of the present invention to provide a method and an apparatus of the above described type lacking these drawbacks.

To that effect, the method is characterized in that the means for determining the position comprise at least one movable ultrasonic signal processing means, e.g. a pointer, and at least one and preferably at least two fixed ultrasonic signal processing means, e.g. at fixed points on either side of the inspection station. The pointer and fixed points signal processing means are respectively equipped with an ultrasonic transmitter and a receiver or the other way round. Use can also be made of combined transceivers on the pointer and at the fixed points.

When the articles to be sorted pass the inspection station along fixed tracks, the sorting, and the determination of the correct position can also take place by determining the positions in longitudinal direction by different means, e.g. a detection means such as a photoelectric cell, provided above each track and a single combination of an ultrasonic transmitter and a receiver.

Use can also be made of a combination of e.g. a photoelectric cell and one transmitter and two receivers or the other way round. In this manner, the photoelectric cell determines the track, while two distances are measured by sound measurement, e.g. time lapses, with one transmitter and two receivers, or two transmitters and one receiver. As a result, no communi cable coupling is required any longer between the transmitter and the receivers.

By providing a "dead zone" between the rows succeeding one another in the transport direction, errors in determining the position in the transverse direction or doubtful cases are excluded.

In a further elaboration of the present invention, use can be made of a pointer (movable signal means) which contains more selection media, such as switches or push buttons, thus enabling a further selection, such as removing broken (cracked or leaking) eggs or eggs that are entirely unfit for use, i.e. blood - containing eggs, or eggs that are still usable for bakery purposes, or eggs that are unfit for further processing in an automatic apparatus solely because of a fault such as their shape or colour.

To increase the reliability of the ultrasonic distance measurement, this can be repeated several times with short intervals with selected articles being designated or singled out once only. A certain minimum time interval has to be awaited between these measurements, so that when the next measurement is performed, the ultrasonic sound waves of the preceding measurement have sufficiently died out.

For the sake of completeness, reference is made to German patent applications 3,036,927 and 3,036,949, both relating to a system for the transfer of coordinates of selected points. These publications concern the application of an auxiliary source with a stylus having a special radiation input. When the stylus point receives a signal, the coordinates thereof are determined, with the stylus transmitting a command signal to a receiver establishing the X-Y position of the article at that moment. Contrary thereto, according to the present invention, the coordinates are determined directly by means of the pointer.

An essential feature is that in the above German publications, a point of time is measured, whereas in the present invention, the distance between transmitter and receiver(s) is measured.

Another difference is that the known systems proceed according to a fixed pattern which is periodically scanned.

A further very important difference is the fact that, according to the present invention, the coordinate is determined from the signal received, i.e. the information is contained in the signal, in contrast to the known apparatuses.

None of the aforecited publications, however, relates to the use of a pointer and at least two fixed points on either side of the inspection station, which pointers and fixed points are fitted with an ultrasonic transmitter and a receiver, respectively, or the other way round, or with a combined transceiver.

The present invention further relates to apparatus for performing the above described method, which apparatus is characterized by including a battery-fed pointer which can be handled in a considerably simpler manner than the hitherto used wire-fed pointers; it is true that battery-fed pointers are slightly heavier, but this amply compensates for the drawback going with the feeder cable present in the known pointer.

Some embodiments of the apparatus according to the present invention and the principles used therein will now be described, by way of example, with reference to the accompanying drawings, in which:

FIG. 1 diagrammatically shows the determination of a position of an article by means of a pointer relative to two fixed points;

Figure 1:
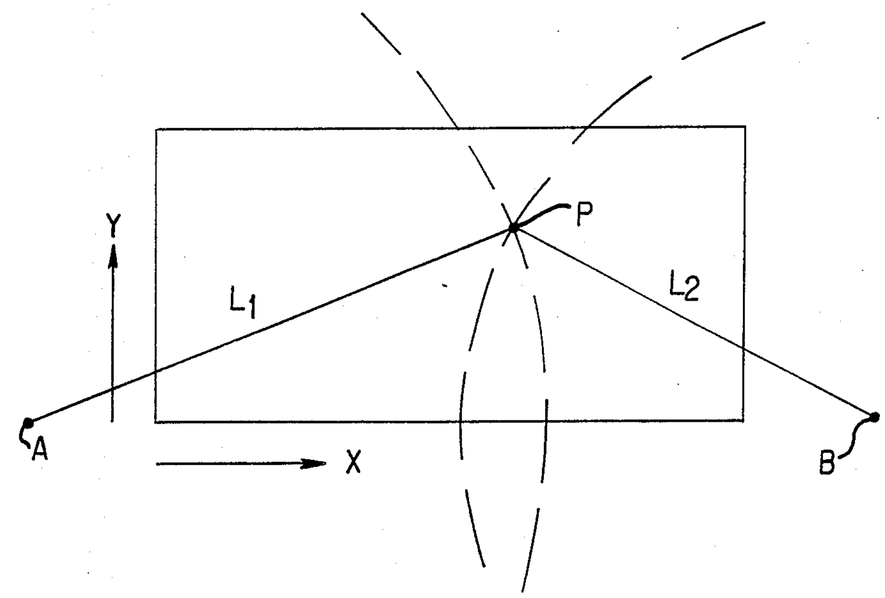

FIG. 1 is a diagrammatic top view of an inspection station, such as an egg candling station, with an X axis and an Y axis. The correct position of a point p can be determined by means of a pointer fitted with an ultrasonic transmitter (movable signal means) relative to two fixed points A and B. The point of intersection of the radii $L_1$ and $L_2$ then gives the position of the article on the inspection device at the moment of measurement.

As the articles to be sorted are moving, their position relative to the fixed system of coordinates and hence relative to the place of selection and the place where the article is to be removed will change continuously conveniently, therefore, after the position relative to the fixed system of coördinates has been determined, this is translated into a system of coordinates related to a sorting apparatus. For that purpose, it is necessary that synchronization signals are generated from the sorting apparatus or that a system of coordinates of the sorting apparatus is otherwise related to the fixed system of coordinates. Thus, for example, when the speed of the machine is constant, a fixed time delay may be used. Naturally, it is also possible continually to adjust the coordinates of the article, since the article is displaced via a defined pattern.

Anyway, it is necessary that there is a coupling, i.e. synchronization, between the position of the article at the moment when the article is being selected and the position at which the article is to be removed. Systems of this kind are known per se, see e.g. the above mentioned publications, so that a further description thereof can be dispensed with.

It will be clear that instead of designing the ultrasonic transmitter as a pointer and the fixed points as a receiver, it is also possible to construct the pointer as a receiver and the fixed points as a transmitter. Designing the pointer as an ultrasonic transmitter has the advantage that the pointer can be passive, since it only needs to radiate.

The above described system has some drawbacks:

a. the distances measured should be converted into X-Y coordinates.

b. small deviations in the distance measured can give large deviations in the Y-value.

c. it is necessary that the transmitter transmits the ultrasonic signal over the entire selection region in such a manner that the receivers can receive the signal. This seems obvious but since the wavelength of an ultrasonic sound wave is small (e.g. at 40 kHz, the wavelength is about 8.5 mm), the dimensions of the transmitters and receivers are comparatively large in relation to the wavelength of the sound employed. This results in a strong orientation effect.

However, if use is made of a system wherein the articles to be sorted are disposed in rows on a conveyor belt, a roller conveyor or the like, a substantial simplification is possible.

Figure 2:
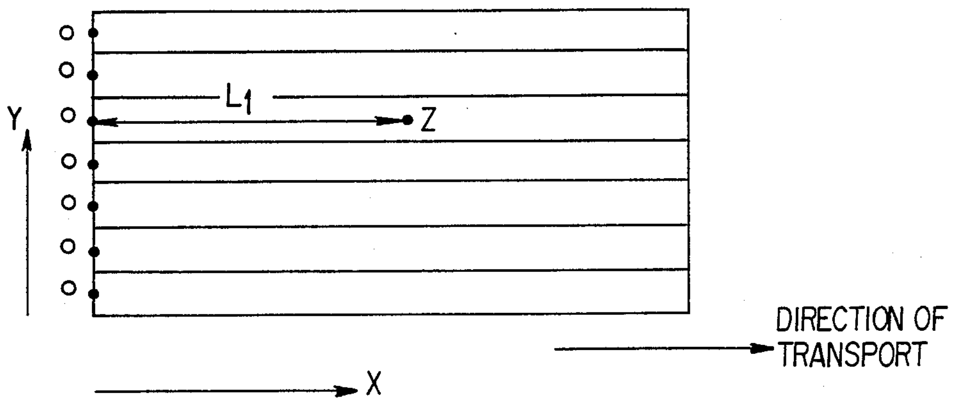
FIG. 2 shows the determination of the position of an article when this moves along a fixed track.

As shown in FIG. 2, the Y coordinate (=the row on which the article to be sorted is disposed) in such a system will not vary; only the X coordinate changes with the time. The Y coordinate can thus be determined in a simple manner, e.g. with a detector such as a photoelectric cell. The problem of the location is thus reduced to a one-dimensional problem, i.e. the determination of the X coordinate. As the number of photoelectric cells along the Y coordinate corresponds with the number of tracks, it is only the X coordinate which needs to be measured and the synchronization of the machine should be known.

Figure 3:
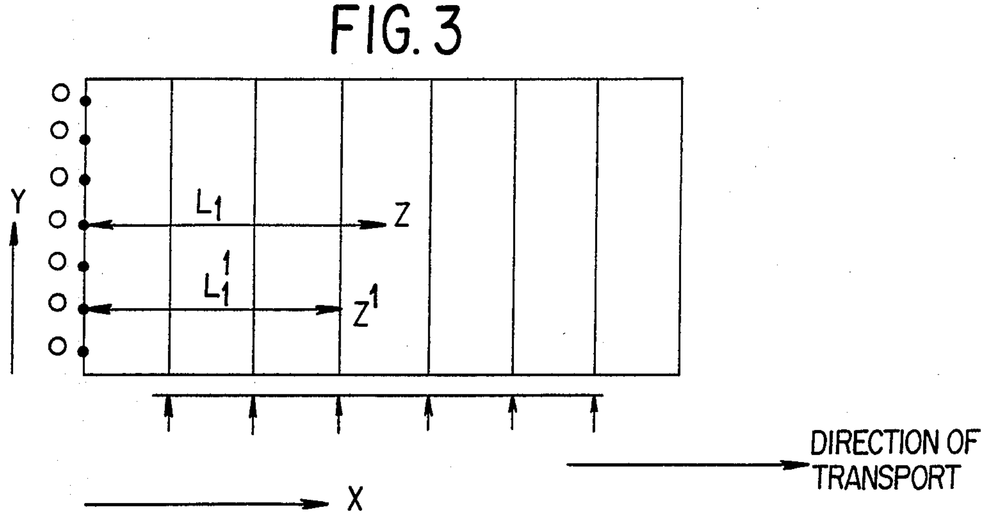
FIG. 3 shows the determination of the position of an article when this moves along a fixed track and likewise is arranged in rows in X-direction.

When articles are arranged at fixed intervals in the X direction (e.g. when the articles are disposed on rollers, or in compartments, etc.) then it is possible to compare the distance $L_1$ measured with the positions at which articles may be present. This is shown in FIG. 3; the arrows indicate the places where there can be no article, since rollers, partitions, etc. are present here.

The distance $L_1$ measured belongs to an article but the distance $L_1{}^1$ cannot belong to an article, because at this location there can be no article. This distance measurement can then be ignored by the system. By refusing to accept distance measurement in a region around the places where no article can be present, mistaking two articles is excluded, even when articles are designated or singled out in the boundary region between two articles.

There is thus produced a pattern of "dead zones" (indicated with arrows in FIG. 4) and "active zones" in places where the distance measurement is or is not accepted.

As the articles are displaced in the direction of transport, the synchronization with the machine has to ensure that the "dead zones" and "the active zones" shift along with the articles to be sorted.

In a system with ultrasonic distance measurement, it is important to know at what moment a signal is transmitted and the moment when the signal is received in order to determine the transit time (time lapse) therefrom. This means that somehow there should be a communic cable coupling between the transmitter and the receiver, e.g. a cable through which the electrical signal is transmitted. Although this is not an essential drawback, it may be a practical drawback of the use of the pointer and hence of the system.

Figure 4:
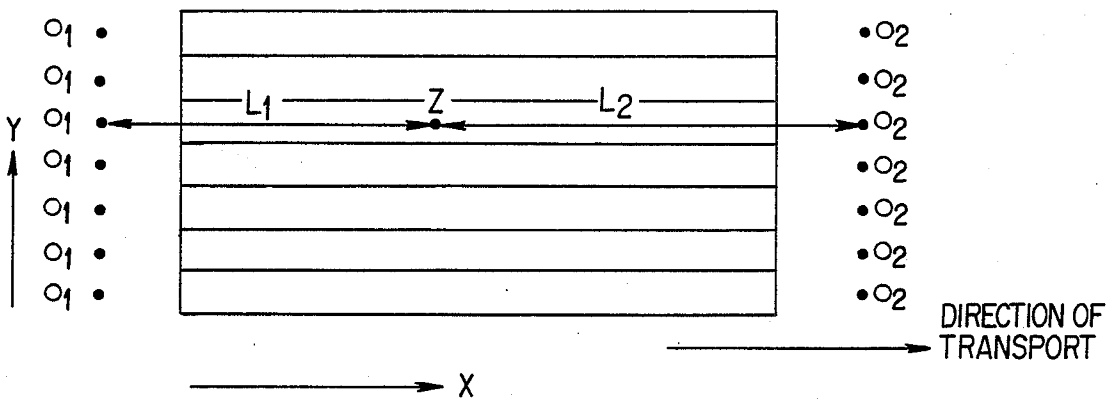
FIG. 4 shows a variant of the construction shown in FIG. 2.

FIG. 4 shows an arrangement wherein no communi cable coupling is required any more between the transmitter and the receiver. As a result, the number of receivers has been extended, and two distances in the X direction are measured in addition to the chosen track in the Y direction. By measuring the difference in time lapses which is equivalent to the differences in distance from the article z to the receivers 01 and 02, respectively, the position relative to the centre of the receivers is fixed. In this case, therefore only the difference between L1 and L2 need be determined, without the values themselves being known. As L1 and L2 are measured as the times of travel (time lapses) of the ultrasonic sound from the transmitter to the receivers the difference in time lapses of the ultrasonic sound to the receivers 01, 02 contains the information regarding the position of the pointer, in other words, the moment when the signal is transmitted is no longer important to this measurement since it is only the difference which is important. As a result, the coupling communi cable between transmitter and receivers can be eliminated.

In order to enhance the reliability of the ultrasonic distance measurement, a measurement can be repeated several times. However, there should be a certain minimum time interval between the measurements, so that when the next measurement is performed, the ultrasonic sound waves of the preceding measurement will have died out.

As stated before, various selection criteria can be indicated by using various selection media, such as push buttons, switches, etc., so as to indicate on the basis of which selection criterion an article is selected. These selection media can be integrated on the pointer, which again requires a cable, however. Selection criteria may be e.g. indications whether the article is completely unfit for use or unfit for use for specific purposes, for instance an egg may be totally unfit for further use, i.e. contains blood, or an egg may have a fault, e.g. it may deviate as regards size and coulour but may still be suitable for consumption.

When use is made of a system wherein measurements are repeated to increase reliability, it is possible to vary the time between two measurements, depending upon the selection criterion. By measuring this interval in the signal received, it is possible to determine the criterion on which the article has been selected, so that this too, requires no coupling, such as a cable, between the pointer and the total system.

Figure 5:
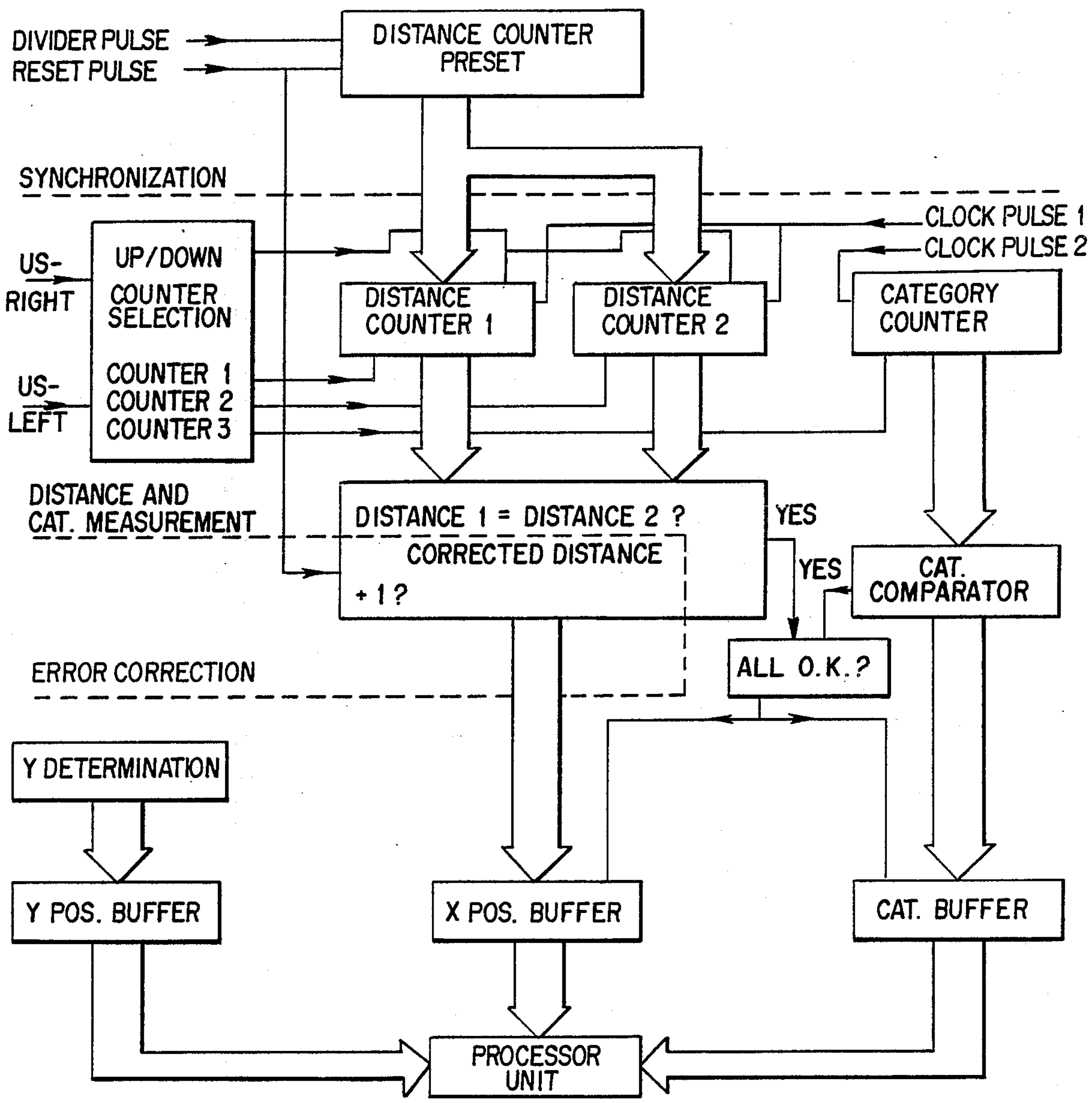
FIG. 5 is a block diagram of a sorting apparatus according to the present invention.

Referring to FIG. 5, showing a block diagram of a system built up according to the above described principle, the following can be observed.

Distance counters 1 and 2 are preset with a value corresponding with the central position. When an ultrasonic signal is received, it is determined in the counter selection what signal was first, ultrasonic right or ultrasonic left (these signals originate from receivers 02 and 01, respectively, in FIG. 2). In response thereto, the distance counters add or subtract.

In the first measurement, counter 1 is started when a signal is received from one of the ultrasonic receivers and counter 1 is stopped when the signal of the other ultrasonic receiver is received. This therefore fixes the position.

Likewise, counter 2 is started and stopped in the second measurement. By comparing the positions of counters 1 and 2, it is possible to determine whether it was a correct measurement, since with equal positions, the counter positions should be equal.

Due to the counter selection, the category counter is started too at the beginning of measurement 1, and at the beginning of measurement 2, this counter is stopped. As a result, the interval between the two measurements is measured and hence the selection criterion is determined. It is determined in the category comparator whether this is a valid selection criterion.

When both the distance measurement and the selection criterion determination are correct, the interposed buffers are filled and the processing unit, e.g. a microprocessor, can read out these values. Naturally, a comparable system can be realized with three or more counters.

As the articles are moving relatively to a fixed system of coordinates, synchronization is necessary with the machine. When this machine consists e.g. of a conveyor belt, on which the articles to be selected are transported, synchronization can be effected as follows.

Upon displacement along one row, a signal is generated: the rest pulse. The displacement along this distance is divided into—preferably equal—parts, e.g. 8 parts; each time when such a part has been traversed, a signal is generated: the divider pulse.

When the reset pulse arrives, this means that all articles have been shifted one row in the direction of transport. The article lying first in row 1 has thus been transported to row 2, as viewed in the X direction, etc. With a view to following the movement of the article, the row number has therefore to be increased by one upon each reset pulse. As already observed above, it is highly practical to select the unit of the X coordinates when the distance between two rows, i.e. the X coordinate, is equal to the row number. Due to this mode of operation, the position of the moving article is related to a fixed position. It is also possible to operate the other way round by numbering the position on the conveyor belt and, upon each reset pulse, to renumber the position numbers on the stationary selection place. However, this will not be further discussed.

As it is impossible to displace an article from row 1 to row 2 in an infinitely short time, it is possible that the article has been displaced along a part of row 1. This is what the divider pulses are for. Whenever the article has been displaced along a part $\alpha$ of a row, $\alpha$ is subtracted from the respective coordinate, so that the row number remains constant between two reset pulses. In the system shown in FIG. 5, this is done by using different preset values, depending on the number of divider pulses after the reset pulse. When a reset pulse arrives during the measurement, "one" should be added to the position, because the processing unit has increased everything by one position.

When the articles leave the selection portion, e.g., the candling station, it is known what articles have been selected. These articles may be counted, e.g. by a microprocessor or a flap may for instance be activated so as to remove the article.

In this manner, naturally, a great many modifications and variants are possible without departing from the scope of the present invention.

WHAT WE CLAIMED IS

1. In a method of sorting a plurality of articles which are continuously moved past an inspection station on a moving conveyor means for removing selected ones of the articles from the conveyor means, where the position of the selected article on the moving conveyor means is indicated by a signal generated from a movable means placed in close proximity to the selected article and the signal is process to operate an ejector associated with the conveyor means for removing the selected article, the improvement comprising providing at least one fixed ultrasonic signal processing means disposed about the inspection station and at least one movable ultrasonic signal processing means which is manually movable over the inspection station, wherein the said fixed signal means and the said movable signal means are combinations of ultrasonic transmitters and receivers, determining a selected article on the conveyor means to be removed therefrom, placing the movable signal means in close proximity to said selected article, activating the movable signal means to transmit to or receive from the said fixed signal means an ultrasonic signal, measuring the time lapse of the ultrasonic signal transmission between the said movable signal means and the fixed signal means, whereby the position of the selected article on the conveyor means is determined, moving the conveyor means sufficiently that the position of the selected article is adjacent to the ejector and operating the ejector to remove the selected article from the conveyor means.

2. The method of claim 1 wherein there are at least two fixed signal means disposed about said inspection station and the time lapses or the difference in time lapses of the ultrasonic transmission between the movable signal means and both of the said two fixed signal means are measured for determining the position of the selected article on the conveyor means.

3. The method of claim 2 wherein the two fixed signal means and the movable signal means are communicably coupled and the time lapses are measured.

4. The method of claim 2 wherein the two fixed signal means and the movable signal mans are not communicably coupled and the difference in the time lapses is measured.

5. The process of claim 2 wherein the said time lapses are used to calculate the distances between the movable signal means and the said fixed signal means.

6. The process of claim 5 wherein the said distances relate to a single position on the conveyor means.

7. The method of claim 1 wherein the plurality of articles are arranged in a plurality of longitudinal rows on the conveyor means, and each row has a detector means associated therewith for detecting the presence of the movable signal means in each of the rows, and wherein a signal is generated from detector means to establish the row in which the movable signal means is present when placed next to a selected article.

8. The method of claim 7 wherein the detector means is a photoelectric cell.

9. The method of claim 1 wherein a plurality of articles are arranged in a plurality of longitudinal rows on the conveyor means and each of said rows has a fixed signal means disposed at each end thereof, the movable signal means is placed between the said fixed signal means and in close proximity to a selected article, the movable signal means is activated and the time lapse or difference in time lapse of the ultrasonic signal transmission is measured to determine the position of the selected article in a selected row.

10. The method of claim 1 wherein the said position of a selected article is determined a plurality of times and there is a predetermined time interval between each determination wherein the reliability of the determination of the position of the selected article is improved.

11. The method of claim 10 wherein the time interval between determination is used to indicate the criterion for selecting the article.

12. The method of claim 11 wherein the article is an egg and the said criterion is a leaking egg, a cracked egg, a blood-containing egg, or an egg with a fault therein.

13. The method of claim 1 wherein the movable signal means is a battery-powered means.

* * * * *

UNITED STATES PATENT AND TRADEMARK OFFICE
CERTIFICATE OF CORRECTION

PATENT NO. : 4,919,798

DATED : April 24, 1990

INVENTOR(S) : Peter Anton van Asselt and Jan Hordijk

It is certified that error appears in the above—identified patent and that said Letters Patent is hereby corrected as shown below:

On the first page of the patent, in the space which identifies the inventors' names, which space is indicated by "[75]", please correct the inventors' names as follows:

Change "Peter A. von Asselt" to --Peter A. van Asselt--; and change "Jan Hord k" to --Jan Hordijk--.

Signed and Sealed this

Eleventh Day of June, 1991

*Attest:*

HARRY F. MANBECK, JR.

*Attesting Officer*

*Commissioner of Patents and Trademarks*